Dec. 17, 1957     F. G. GREAVES ET AL     2,816,693

MATERIAL HANDLING VALVE

Filed Nov. 29, 1955     2 Sheets-Sheet 1

INVENTOR.
FRED G. GREAVES
HANS J. KNAPP
BY
ATTORNEYS

Dec. 17, 1957  F. G. GREAVES ET AL  2,816,693
MATERIAL HANDLING VALVE
Filed Nov. 29, 1955  2 Sheets-Sheet 2
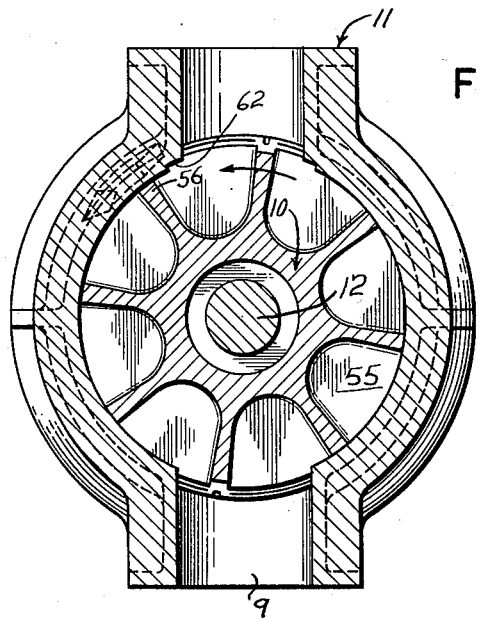
Fig. 3
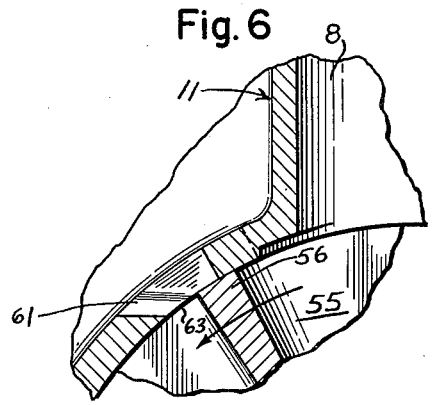
Fig. 6
Fig. 5
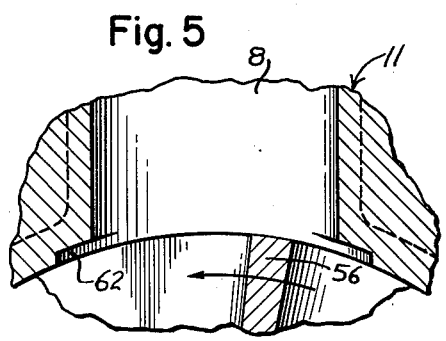
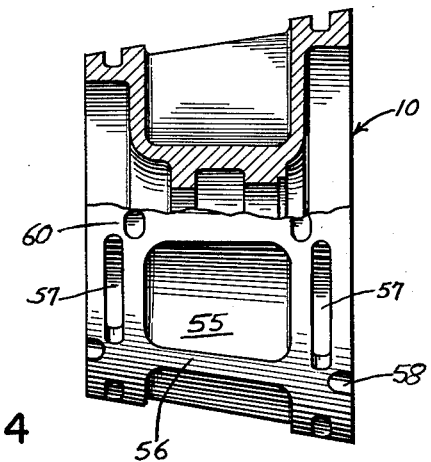
Fig. 4
INVENTOR.
FRED G. GREAVES
HANS J. KNAPP
BY
ATTORNEYS United States Patent Office 2,816,693
Patented Dec. 17, 1957

2,816,693

MATERIAL HANDLING VALVE

Fred G. Greaves, Seattle, Wash., and Hans John Knapp, Portland, Oreg., assignors, by mesne assignments, to The Bauer Bros. Company, Springfield, Ohio, a corporation of Ohio Application November 29, 1955, Serial No. 549,672

5 Claims. (Cl. 222—342)

This invention relates to a material handling valve which is self-cleaning and can be used to continuously feed material between regions of different pressures without causing an objectionable drop in the differential pressure. More particularly, the invention relates to such a valve in which a circumferentially pocketed rotor turns in a housing between inlet and outlet ports therein.

A particularly important application of this type of valve is in relation to the cooking of wood chips at high pressures. The chips are continuously fed by such a valve into a pressurized cooker, and similarly, on the outlet end of the cooker is a second valve which continuously feeds cooked wood fibers from the cooker. Some of these fibers permeated by wood degradation products are bound to work from the cooker between the rotor and housing of the valves and upon evaporation of the water the fibers and degradation products form a hard solid coating or crust on the working faces of the valve. Such a crust of course tends to bind up the valve. Even if some relief from this tendency is given by tapering the rotor and its seat by yieldingly seating the rotor, excessive loss of steam from the cooker is likely as the rotor backs away from its seat because the crust does not accumulate evenly over the working surfaces. Accordingly, we aim to provide such a valve with self-cleaning means whereby any material which may work its way between the rotor and housing is automatically removed immediately.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Fig. 3 is a transverse sectional view taken along the line 3—3 of Fig. 1.

Fig. 4 is a side elevational view of the valve rotor partly in section.

Fig. 5 is an enlarged fragmentary view looking down the ends of the undercuts in the inlet opening as shown in Fig. 3 with the line of sight being tilted from the horizontal in a degree corresponding to the amount of the rotor taper; and Fig. 6 is a fragmentary transverse sectional view taken along the line 6—6 of Fig. 1.

Figure 2:
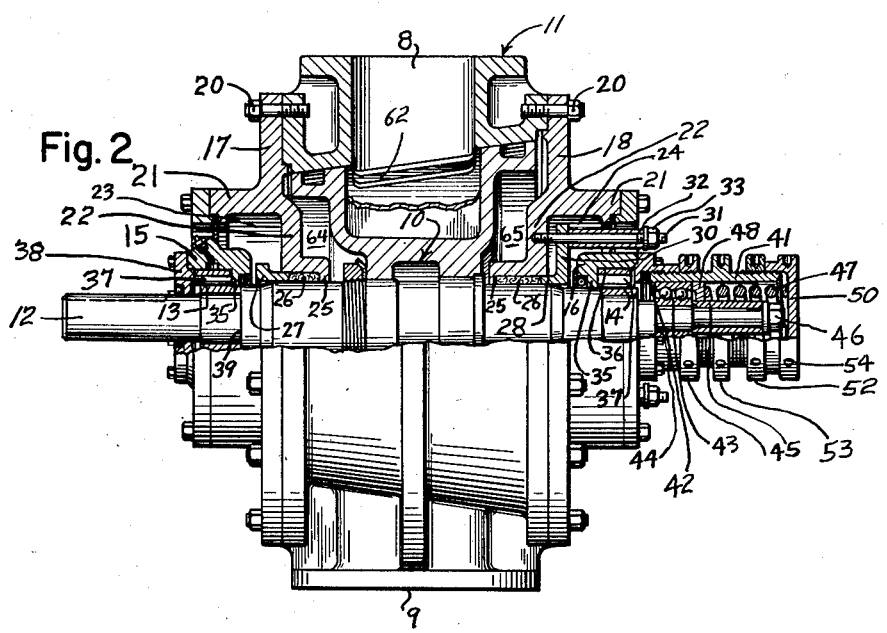
Fig. 2 is a side elevational view of the valve with the upper half thereof shown in section.

Referring to the drawings it is seen that the valve of the present invention comprises a frusto-conical pocketed rotor 10 journaled in the tapered bore of a valve body 11 having inlet and outlet ports 8, 9 at the top and bottom. The rotor is driven by a drive shaft 12 journaled in a pair of axially spaced bearings 13, 14. These bearings are carried in bearing housings 15, 16 which are in turn supported by headers 17, 18 in a manner to be hereinafter detailed. The headers are detachably secured by bolts 20 to the valve body, and the headers together with the valve body serve as a housing for the rotor. Toward the shaft 12 from their bolt connections to the valve body the headers branch into oppositely directed circumscribing flanges 21 concentric with the drive shaft and inwardly directed annular flanges 22 each having a generally L-shaped cross-section. These flanges 21, 22 together with bearing housings 15, 16 define annular cavities 23, 24 surrounding the shaft 12. At the extreme inner end of each header the flange 22 presents an annular lip 25 directed towards the shaft and serving as a floor for the well of a packing gland defined between the header and the shaft. The packing 26 in each packing gland is held in position by a retainer 27 presenting an inturned lip 28 engaging the packing and having radially extending anchoring arms 30. Each of these arms slidably receives an elongated stud 31 threaded at both ends. These studs are anchored in the headers as shown in Fig. 2 and project out through openings in the bearing housings 15, 16 so that ready access can be had to the head ends thereof. A sleeve 32 is received over each stud externally of the respective anchoring arm 30 and is brought to bear on the arm for urging the inturned lip 28 against the packing by the act of turning a nut 33 screwed onto the free end of the stud.

The bearing housings 15 and 16 are each composed of a main body portion and an inturned annular stop 35. Between this main body portion and the shaft 12 is fitted the outer race 36 of the respective bearing 13, 14 and the annular stop 35 limits inward movement of such race and associated rollers 37 while a respective shaft shoulder 39 limits inward movement of the inner race.

The outer race and rollers of the bearing 13 are retained by a cap 38 and the corresponding parts of the other bearing 14 are held in position against the stop 35 by a hollow bearing closure 40 bolted to the bearing housing 16. This closure 40 has an internally threaded bore which receives one end of an externally threaded thrust-adjusting sleeve 41. In turn, this sleeve presents an inturned shoulder 42 for limiting inward axial movement of a roller bearing 43 whose inner race is retained in position about the shaft by a shaft stop 44 at one end and a shaft sleeve 45 at the other end. The latter said sleeve is held in position by a nut 46 screwed onto the outer end of the shaft. Occupying the space between the sleeve 45 and the thrust-adjusting sleeve 41 is a compression spring 47 bearing at its inner end upon a thrust collar 48 and retained at its outer end by an end plate 50 threadably received on the outer end of the thrust-adjusting sleeve. The thrust collar 48 in turn bears against the outer race of the roller bearing 43 so that the effect of the compression spring 47 is to yieldingly hold the bearing against the stop 42. Lock nuts 51 and 52 are provided to hold the thrust-adjusting sleeve 41 and end plate 50, respectively, against turning movement. The thrust-adjusting sleeve 41 is provided with a wrench-receiving flange 53 intermediate its ends, and this flange, the lock nuts, and the end plate each present circumferentially spaced holes 54 for receiving a spanner wrench so that they can easily be turned when adjustment is to be made.

At this point it will appear obvious that the thrust adjusting sleeve 41, by means of its stop 42, serves to positively limit inward movement of the shaft and therefore limits the degree of seating of the rotor. The adjustable end plate 50 permits ready adjustment of the force of the spring 47 which acts through the shaft 12 to yieldingly seat the valve 10. It should be noted particularly that these adjustments of the sleeve 41 and end plate 50 can be readily made independently of one another and while the valve is in operation.

The tapered rotor 10 itself, as best shown in Fig. 3, is provided with a plurality of fully contained material-handling pockets 55 extending radially to the outer periphery of the rotor and separated by vanes 56. The particular shape of the mouth of these pockets is not critical but it is preferred to have the vanes of substantially uniform width in which case the pocket mouth is generally trapezoidal with the ends being the parallel sides. The end walls of each pocket are substantially parallel whereas the side walls converge and are joined by a curved bottom wall.

It is important that the taper of the rotor and the bore of the valve body be sufficient to negate any natural tendency for the rotor to bind in he bore. In this regard an eight degree taper relative to the axis of rotation gives excellent performance.

In addition to the material handling pockets 55 the valve rotor is provided with relatively shallow recesses or auxiliary pockets which are arranged in such a manner that in conjunction with the material handling pockets they span the entire length of the rotor. In the embodiment illustrated in the drawings elongated auxiliary pockets or recesses 57 are provided between the ends of the pockets 55 and the ends of the rotor 10. These auxiliary pockets are supplemented by smaller auxiliary pockets 58 each open to an end of the rotor and extending to a slight degree between respective pairs of pockets 57. Another group of small auxiliary pockets 60 slightly lap the elongated auxiliary pockets 57 and the material handling pockets 55. With this arrangement there is a continuous band of pockets around the rotor. Accordingly, if matter should happen to work between the rotor and valve body and adhere to the tapered seat of the latter it will cause the rotor to unseat slightly until such matter reaches one of the auxiliary pockets whereupon the rotor will reseat causing the matter to protrude into the auxiliary pocket and the trailing edge of the latter to thereafter wipe the matter from the seat into the pocket.

Complementing functionally the auxiliary pockets in the rotor are a pair of relief openings or recesses 61 in the valve housing located on opposite sides of the transverse centerline of the housing and adjacent the trailing edge of the inlet opening. These relief openings overlie part of the end portions of the material handling pockets and extend endwise of the valve a sufficient distance to also overlie the elongated auxiliary pockets 57. As best shown in Fig. 6, the trailing edge of each relief opening 61 is sloped at an acute angle with the valve seat so as to present a scraping edge 63. This scraping edge functions when material has worked between the rotor and valve body and adhered to the latter. In such a case the rotor unseats slightly until the material protrudes into the relief opening and then reseats whereupon the scraping edge 63 wipes the material from the rotor into the relief opening.

When the valve is connected to the inlet of a pressurized vessel such as a wood chip cooker there will normally be some steam leakage from the cooker through the valve outlet opening and into the end cavities 64, 65, thereby pressurizing the latter. In some cases it may be desirable to connect the end cavities directly with a source of fluid under a pressure as great or greater than in the cooker. In this regard, a force differential can be established on the ends of the valve rotor by controlling the pressures in the end cavities, and this differential can be used in conjunction with or, in some instances in place of spring 47 to load the rotor.

At any rate, pressurized fluid in the end cavities 64, 65 is desirable as an aid in cleaning the valve as will now be explained. Some of this fluid will leak continuously past the ends of the rotor to the auxiliary pockets and relief openings. The latter can be open to the atmosphere as shown in the drawings or can be covered. In the former case, the steam or other fluid leaking past the ends of the rotor will discharge to the atmosphere through the relief openings 61. As this occurs most material which has been scraped into the auxiliary pockets will be blown out. If the relief openings are covered, such material will be blown from the auxiliary pockets into the material handling pockets via the relief openings as the material handling pockets pass therebeneath. Thus it is seen that our valve in self-cleaning.

Although not shown in the drawings, it is to be understood that the material handling pockets of a valve attached to the inlet part of a pressurized vessel can be vented consecutively after emptying into the vessel so that there cannot be a pressure condition in the pocket approaching the ingress opening of the valve which might hinder the filling thereof. Likewise, the pockets can be pressurized consecutively after being filled so that the pressure in the cooker will not deter their emptying therein. It is to be noted that desirably the length of the inlet port is less than the width of the material-handling pockets and that conversely, the length of the outlet port desirably exceeds that of the material-handling pockets.

Figure 1:
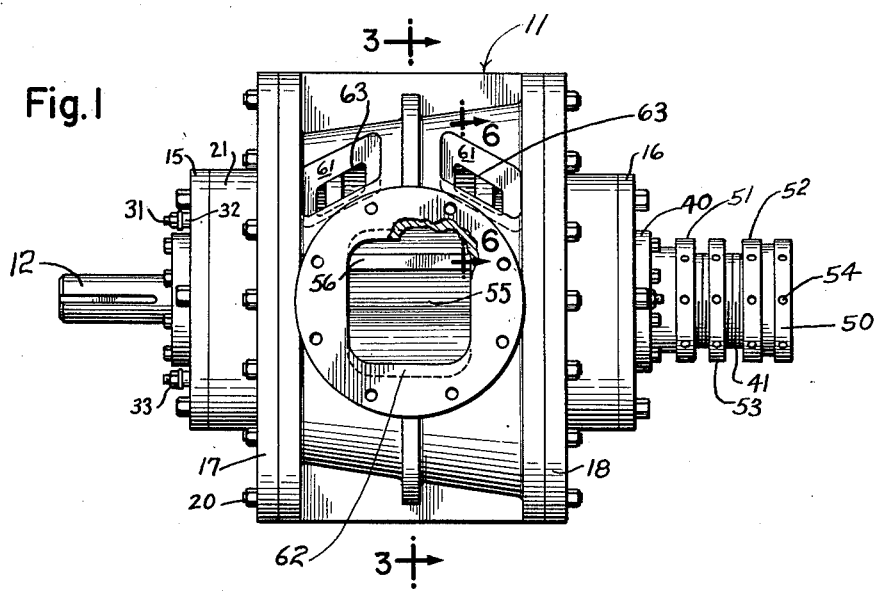
Figure 1 is a top plan view of the valve assembly with parts broken away.

The leading edge of the inlet opening is preferably undercut to prevent wedging and shearing of the material to be handled between the rotor vanes and the valve body. This undercut, denoted by the numeral 62, extends at least the entire width of the inlet opening as shown by the dotted representation of the undercut in Fig. 1. The depth of the undercut is preferably uniform as illustrated in Fig. 5 and is made somewhat greater than the thickness of the chips or other material to be handled so that the same will not wedge between a vane 56 and the roof of the undercut.

The above-described valve can be used successfully to continuously feed material to or from a vessel kept under a sub-atmospheric pressure as well as to a pressurized vessel.

The advantages of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

What we claim is:

1. A continuous feeder comprising a housing presenting a tapered seat and circumferentially spaced ingress and egress openings in the tapered working face of the seat, a tapered valve mounted in the seat for both rotary and endwise movement and presenting a plurality of circumferentially spaced fully contained pockets exposed to the tapered working face of the valve, and arranged to successively communicate with the said ingress and egress openings, said valve also presenting recesses located in the end portions of the valve lying endwise of said pockets and said working face of the seat presenting recesses overlying said end portions of the valve and arranged to successively communicate with said recesses in the valve, and means yieldingly urging said valve toward its said seat, whereby material adhering to said end portions of the valve will slightly unseat the valve until said material reaches and protrudes into a said recess in the seat whereupon the edge of such recess will wipe the material from the valve into the recess and whereby similarly, material adhering to said seat in areas thereof overlying said end portions of the valve will slightly unseat the valve until such material reaches and protrudes into a said recess in the valve whereupon the trailing edge of such recess will wipe the material from the seat into the recess.

2. A continuous feeder comprising a housing presenting a tapered seat and circumferentially spaced ingress and egress openings in the tapered working face of the seat, a tapered valve mounted in the seat for both rotary and endwise movement and presenting a plurality of circumferentially spaced fully contained pockets exposed in the tapered working face of the valve and arranged to successively communicate with the said ingress and egress openings, said working face of the seat presenting recesses overlying the end portions of the valve located endwise of said pockets therein, said recesses communicating with the outside of said housing and means yieldingly urging said valve toward its said seat, whereby material adhering to said end portions of the valve will slightly unseat the valve until such material reaches and protrudes into a said recess in the seat whereupon the leading edge of such recess will wipe the material from the valve into the recess.

3. A continuous feeder comprising a housing presenting a tapered seat and circumferentially spaced ingress and egress openings in the tapered working face of the seat and having a differential pressure therebetween, a tapered valve mounted in the seat for both rotary and endwise movement and presenting a plurality of circumferentially spaced fully contained pockets exposed to the tapered working face of the valve and arranged to successively communicate with the said ingress and egress openings, said working face of the seat presenting recesses overlying the end portions of the valve located endwise of said pockets therein and partly overlying the pocketed portion of said valve, and means yieldingly urging said valve toward its said seat, whereby material adhering to said end portions of the valve will slightly unseat the valve until such material reaches and protrudes into a said recess in the seat whereupon the leading edge of such recess will wipe the material from the valve into the recess, said recesses being located in trailing relation to the said opening in the housing having the higher pressure and opening to the outside of the housing whereby material wiped into said recesses will be blown outwardly from the recesses as the pockets are vented through said recesses as the pockets travel toward the said opening having the lower pressure.

4. A continuous feeder comprising a housing presenting a tapered seat and circumferentially spaced ingress and egress openings in the tapered working face of the seat, a tapered valve mounted in the seat for both rotary and endwise movement and presenting a plurality of circumferentially spaced fully contained pockets exposed to the tapered working face of the valve and arranged to successively communicate with the said ingress and egress openings, said working face of the seat presenting recesses overlying the end portions of the valve located endwise of said pockets therein and having its leading edge wedge-shaped to serve as a scraper, and means yieldingly urging said valve toward its said seat, whereby material adhering to said end portions of the valve will slightly unseat the valve until such material reaches and protrudes into a said recess in the seat whereupon the leading edge of such recess will wipe the material from the valve into the recess.

5. In a continuous feeder comprising a housing presenting a tapered seat and circumferentially spaced ingress and egress openings in the tapered working face of the seat, a tapered valve mounted in the seat for both rotary and endwise movement and presenting a plurality of circumferentially spaced fully contained pockets exposed in the tapered working face of the valve and arranged to successively communicate with the said ingress and egress openings, said working face of the seat presenting recesses overlying the end portions of the valve located endwise of said pockets therein, said recesses partly overlying the pocketed portion of said valve so as to progressively communicate with said pockets in the valve, and means yieldingly urging said valve toward its said seat, whereby material adhering to said end portions of the valve will slightly unseat the valve until such material reaches and protrudes into a said recess in the seat whereupon the leading edge of such recess will wipe the material from the valve into the recess.

References Cited in the file of this patent

UNITED STATES PATENTS

| | | |
|---|---|---|
| 879,000 | Pitner | Feb. 11, 1908 |
| 941,024 | Mantius | Nov. 23, 1909 |